United States Patent [19]

French

[11] Patent Number: 6,050,256

[45] Date of Patent: Apr. 18, 2000

[54] MOVABLE CAMPFIRE BOX

[76] Inventor: John R. French, 401 W. A St., Suite 1300, San Diego, Calif. 92101

[21] Appl. No.: 09/098,633

[22] Filed: Jun. 16, 1998

[51] Int. Cl.[7] .................................. F24B 1/00; F24B 1/191
[52] U.S. Cl. .................................... 126/25 R; 126/275 R; 126/276
[58] Field of Search ............................... 126/25 R, 275 R, 126/276

[56] References Cited

U.S. PATENT DOCUMENTS

| | | | |
|---|---|---|---|
| 1,002,716 | 9/1911 | Lowrie | 126/275 R |
| 2,057,373 | 10/1936 | Dukes | 126/275 R |
| 2,102,217 | 12/1937 | Polhemus | 126/25 R |
| 2,161,669 | 9/1939 | Freeman | 126/25 R |
| 3,581,731 | 6/1971 | Schulze | 126/25 R |
| 5,070,857 | 12/1991 | Sarten | 126/25 R |

*Primary Examiner*—Ira S. Lazarus
*Assistant Examiner*—Sara Clarke
*Attorney, Agent, or Firm*—Brown, Martin, Haller & McClain, LLP

[57] ABSTRACT

A campfire box forms an enclosure having an open top, a closed bottom floor, and inner and outer side walls extending around the periphery of the enclosure with the inner side walls being of insulating material. One or more layers of fire insulating material cover the floor. The insulating side panels and floor provide a cavity formed of fire insulating material for enclosing combustible material.

32 Claims, 6 Drawing Sheets

MOVABLE CAMPFIRE BOX

BACKGROUND OF THE INVENTION

The present invention relates generally to an outdoor campfire box providing a fireplace in which a campfire may be built, and which may be used in a backyard or on a patio.

Campfires and indoor fireplaces provide a source of heat as well as the attractive and enjoyable aspect of watching open flames as the fire burns down. Campfires additionally provide a heat source for cooking foods. Beaches and parks often have metal, concrete or masonry barbecues or campfires in which people can place wood for burning when spending an evening outdoors. However, permanently fixed campfire pits of this type would be unsuitable and expensive for use in a more confined area such as a backyard or patio.

Some backyard, outdoor fireplace units have been proposed in the past, but these are typically of all metal construction and become very hot during use, posing a risk of burns to individuals, pets, plants, and structures. They are also not particularly attractive in appearance. U.S. Pat. No. 4,363,313 of Smith describes a portable campfire fireplace both for containing a campfire and providing a cooking surface. This simply consists of a rectangular box of metal on which a grill is adjustably secured. This will also become undesirably hot during use.

SUMMARY OF THE INVENTION

It is an object of the present invention to provide a new and improved campfire box which is particularly suitable for backyard or patio use.

According to the present invention, a campfire box is provided which comprises an enclosure having an open top, a closed floor, outer side walls extending around the periphery of the enclosure, inner side walls extending over the inner surface of the outer side walls for containing a fire, and a layer of fire insulating material covering the floor, providing an inner cavity of fire insulating material for enclosing combustible material. Preferably, the inner and outer side walls are spaced apart to form a predetermined gap between the walls for insulation purposes. Air may provide the insulation, or solid insulating material or panels may fill part or all of the gap. Wheels are preferably positioned adjacent one end of the enclosure for movably supporting the campfire box.

The inner side walls and floor covering layer may both be of firebrick. Alternatively, the inner side walls and floor may comprise insulating panels of cast ceramic or cementious material. In another embodiment, the inner side walls may be of metal enclosing insulating panels of fiber or spun glass. In each case, the outer side walls are preferably of wood. The inner walls may alternatively be of tile or masonry. The outer wood enclosure provides an attractive appearance and also is a good insulator, further reducing the risk of accidental burns. Preferably, an air gap is provided between the inner and outer side walls for further air circulation and insulation.

The lower floor of the enclosure may comprise a pair of spaced, parallel, rigidly supported metal screens forming a housing containing crushed rock, pumice or similar heat absorbing and retaining material similar to the type used in gas barbecue grills. One or more layers of fire insulating material are supported on top of the upper metal screen above the retained pumice material. The fire insulating material may be firebricks or other common brick.

A fire of wood or other combustible material may be built inside the firebox on top of the inner floor. The firebox may be positioned anywhere outdoors to provide a safe, clean, convenient, and attractive outdoor fireplace, and is particularly suitable for use in a backyard or on a patio.

Preferably, a generally semi-cylindrical shaped, retractable fire screen or hood of metal mesh or the like is removably mountable over the open top of the campfire box. This protects individuals, plants, and structures around the fire against flying ashes or sparks.

The movable campfire box of this invention provides a convenient outdoor fireplace which may also be used for cooking if desired, simply by placing a grill over the open top of the enclosure. It is attractive and well insulated so that there will be no external hot surfaces when the campfire box is in use. The wooden box with an insulating material liner and air gap provides a relatively lightweight firebox which is stable against tipping over, not hot to touch, and which may be easily moved.

BRIEF DESCRIPTION OF THE DRAWINGS

The present invention will be better understood from the following detailed description of some preferred embodiments of the invention, taken in conjunction with the accompanying drawings in which like reference numerals refer to like parts and in which.

DESCRIPTION OF THE PREFERRED EMBODIMENTS

FIGS. 1 to 5 illustrate a movable campfire box 10 according to a first embodiment of the present invention. The box 10 basically comprises a four-sided enclosure having a closed floor 12 and an open top 14, with each side having an inner wall or liner 16 and an outer wall 18 which are spaced apart with panels 20 of insulating material located in the space between the inner and outer side walls. Preferably, an air gap 22 is provided between each insulating panel 20 and the respective outer side wall 18, although gap 22 may alternatively be filled with insulating material. Insulating panels 20 may be of any non-combustible insulating material, such as spun glass, fiberglass, masonry, or the like.

Figure 2:
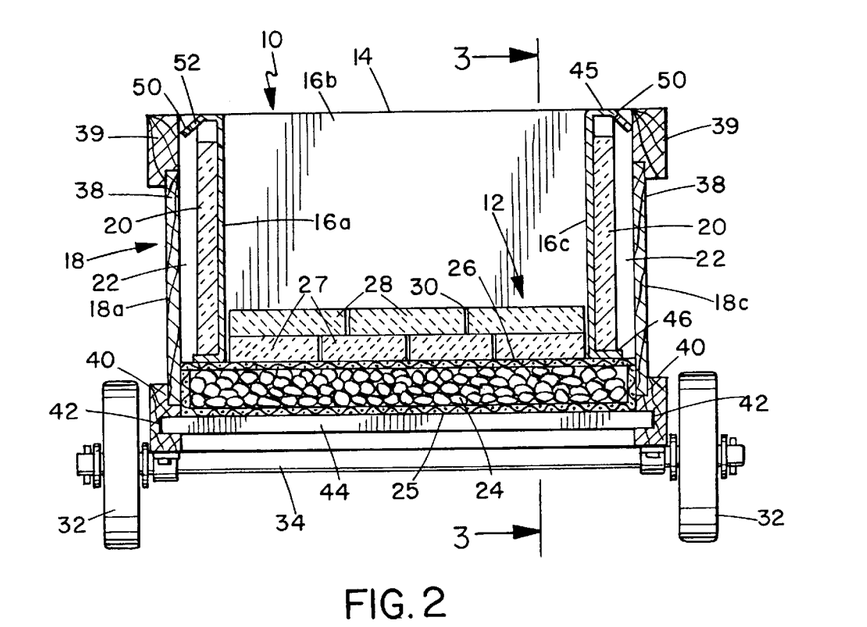
FIG. 2 is a sectional view taken on line 2—2 of FIG. 1.

The bottom or lower floor 12 of the enclosure is preferably also of multi-layer construction. As best illustrated in FIG. 2, the floor 12 comprises a lower layer 24 of insulating material such as crushed rocks, granular pumice or the like enclosed between metal mesh panels 25, 26, and one or more layers 27, 28 of brick or firebrick laid on top of the upper mesh panel or cover 26. If layers 27, 28 of standard clay bricks are used, they may be laid perpendicular to one another so that the gaps 30 between bricks in one layer are not aligned with those in the other layer. This will prevent ash from the combustible material burnt in the enclosure from falling down between the cracks or gaps 30 into the pumice layer 24 below. At the same time, liquid such as rainwater or the like will be able to drain through the gaps 30 and the mesh layers below, so that liquid does not accumulate in the box and cause deterioration or damage to the box. The material in layer 24 may be the same as that used in gas barbecue grills. The firebricks may be of standard, fired red clay or equivalent materials.

Figure 1:
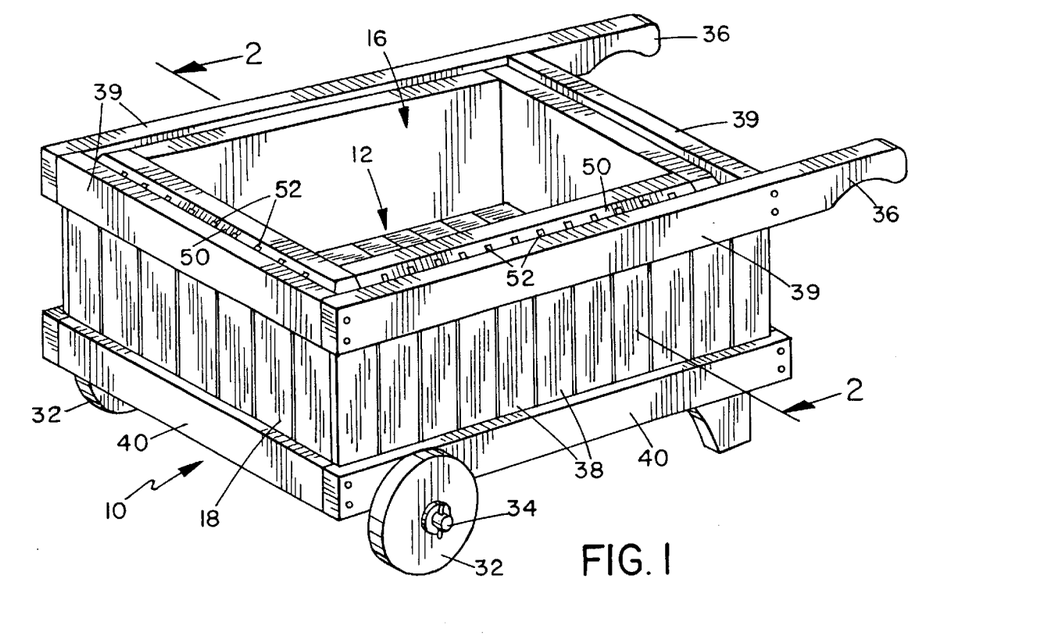
FIG. 1 is a perspective view of the movable campfire box according to a first embodiment of the invention.

Although the firebox 10 in the illustrated embodiment is of square or rectangular shape, it may alternatively be of circular, oval, or other shapes if desired. A pair of wheels 32 are rotatably mounted on axle 34 adjacent one end of the firebox, with one wheel on each side of the firebox. Handles 36 project from the opposite end of the firebox. The handles may be gripped while tilting the firebox to allow it to be wheeled from one position to another on wheels 32.

Figure 3:
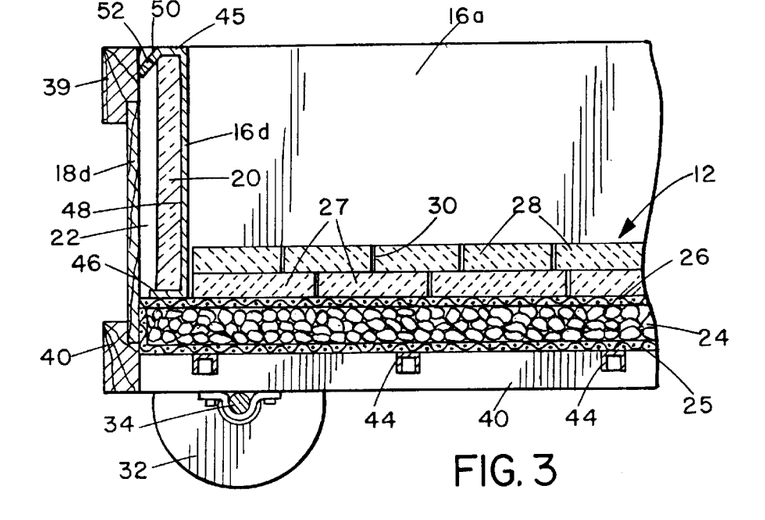
FIG. 3 is a sectional view taken on line 3—3 of FIG. 2.

The outer side walls 18 of the firebox are preferably of wood such as oak, pine, or the like, which are good insulators. Alternatively, walls 18 may be of other materials such as resin-poured, wood look-a-like materials. Preferably, each side wall comprises a plurality of vertical planks 38 with an upper and lower horizontal beam 39, 40 extending across the upper and lower ends, respectively, of the planks, and suitably fastened together by nails or the like. Alternatively, each wall may be a single panel of wood with upper and lower support beams 39, 40. As best illustrated in FIGS. 2 and 3, the lower beams 40 of two opposing side walls have inwardly facing, aligned slots or sockets 42 for receiving the opposite ends of a series of spaced cross bars 44 extending across the box below the lower wall. Cross bars 44 may be channel-shaped and of inexpensive, easily formed metal to provide a rigid support for the mesh panel or tray 25 containing the pumice layer 24. The upper beams 39 on two opposite side walls are preferably elongated beyond one end of the firebox to form the handles 36.

Figure 4:
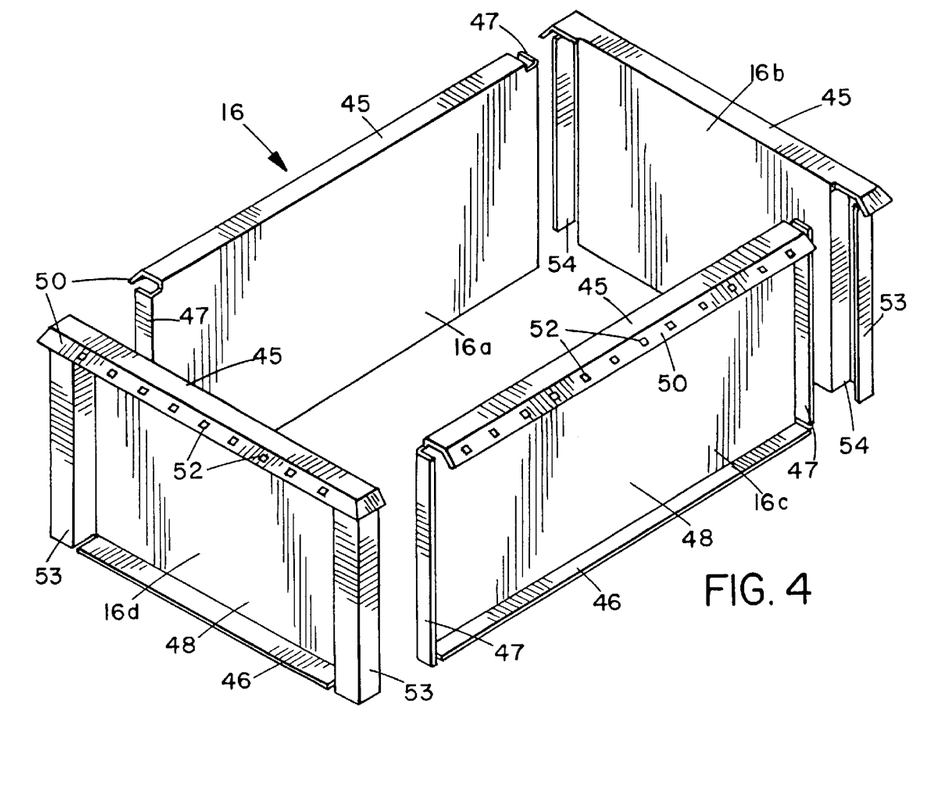
FIG. 4 is a perspective view of the separated components of the metal liner.

The structure of the inner side walls 16 is best illustrated in FIGS. 2, 3 and 4. Each inner side wall comprises a flat metal panel or liner 16a, 16b, 16c, and 16d, respectively, and an insulating panel 20. Each metal panel has peripheral upper and lower rims or flanges 45, 46 respectively projecting outwardly from the metal panel, forming a seating recess 48 for receiving the insulating panel 20, as best illustrated in FIG. 4. The insulating panels may be secured in the respective recesses by adhesive or the like. Each upper rim or flange 45 has a downwardly projecting portion 50 which extends over the upper end of air gap 22 when the liner is installed inside the firebox, as best illustrated in FIGS. 2 and 3. The flanges 50 each have a series of spaced openings 52 for air flow into and out of the air gap.

The panels 16a and 16c forming the two longest sides of the liner or inner wall each have outwardly projecting end flanges 47. The panels 16b and 16d forming the two shortest opposing side walls each have opposite end portions 53 which are bent outwardly and then back inwardly to form inwardly facing, vertical channels or grooves 54 at each end. The channels 54 receive the respective adjacent end flanges 47 of the other two side walls 16a and 16c at the four corners of the box, forming a continuous, smooth and reflective rectangular liner for the box. The panels may thus be interlocked to be installed easily in the proper relation to one another.

Although each insulating side panel 20 in the illustrated embodiment is mounted directly on the metal panel or liner 16, the panels 20 may alternatively be spaced from liners 16 to provide an additional insulating air gap.

Figure 5:
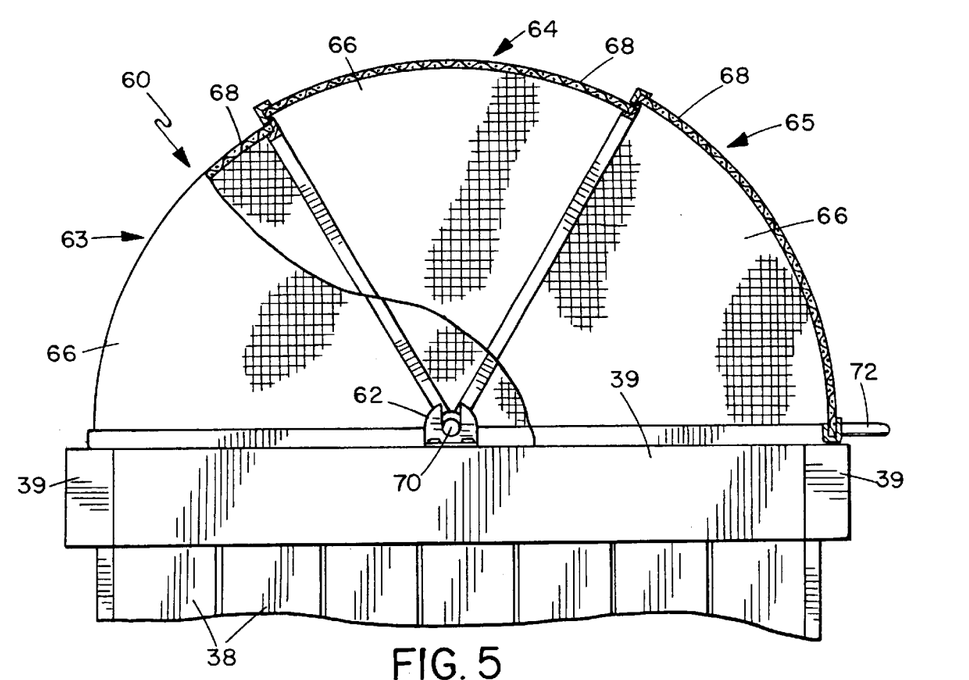
FIG. 5 is an enlarged end view showing the retractable screen cover, which is partially cut away.

A three-part, retractable hood or cover 60 may be removably seated over the open top of the enclosure, as best illustrated in FIG. 5. Support brackets 62 for this purpose are preferably provided on opposite side walls of the enclosure, as indicated in FIGS. 2 and 5. The cover 60 is formed in three pivoting, arcuate sections 63, 64, 65 of gradually increasing radius. Each arcuate section is of wire mesh material and has a pair of spaced arcuate end walls 66 and a curved outer wall 68 extending between the end walls 66, and the end walls 66 are all pivoted together at their apices via hinge pin 70. When fully extended as in FIG. 5, the sections 63, 64, 65 together form a screen of semi-cylindrical shape which completely covers the open top of the firebox. A handle 72 projects from the outer end of the largest section 65, and may be gripped by a user to rotate the section 65 rearwardly over sections 63 and 64, and both sections 64 and 65 rearwardly over section 63 to open the screen or hood as desired. Notches 74 on brackets 62 receive the projecting outer ends of hinge pin 70 to releasably support the cover over the open end of the firebox. Although the hood is in three parts in the illustrated embodiment, it may alternatively be formed in two or more than three parts.

The movable, insulated firebox 10 may be used purely for an outdoor fireplace, or may also be used for cooking purposes. A fire is built inside the firebox by placing wood or other combustible material over the firebrick layer 28. The wood is then lit to provide a fire. The hood or cover 60 may be placed over the open top of the firebox, covering the open flames for safety purposes and to shield people from sparks and flying embers. If desired, a grill panel may be placed over the open end of the firebox, with the edges of the grill panel resting on the upper ends of the side walls, so that food to be barbecued may be supported over the fire. The grill may be mounted on brackets for adjusting the grill height or other suitable supporting structure. The hood 60 may be placed over the open top while cooking, and will also help to reduce hot fat from splashing outside the firebox.

The firebox is very well insulated by means of the insulating panels 20, firebricks in layers 26 and 27, pumice layer 24, air layers 22, and outer walls of wood. This will reduce heat loss apart from via the open top of the firebox, and the outer walls will remain cool so that the outer surface may be touched without risk of accidental burns. The firebox may be readily transported from one location to another, and may conveniently be used as an outdoor fireplace in a backyard or on a patio, or at any other desired location. It is of an attractive outer appearance, unlike many outdoor barbecue grills and the like.

Figure 6:
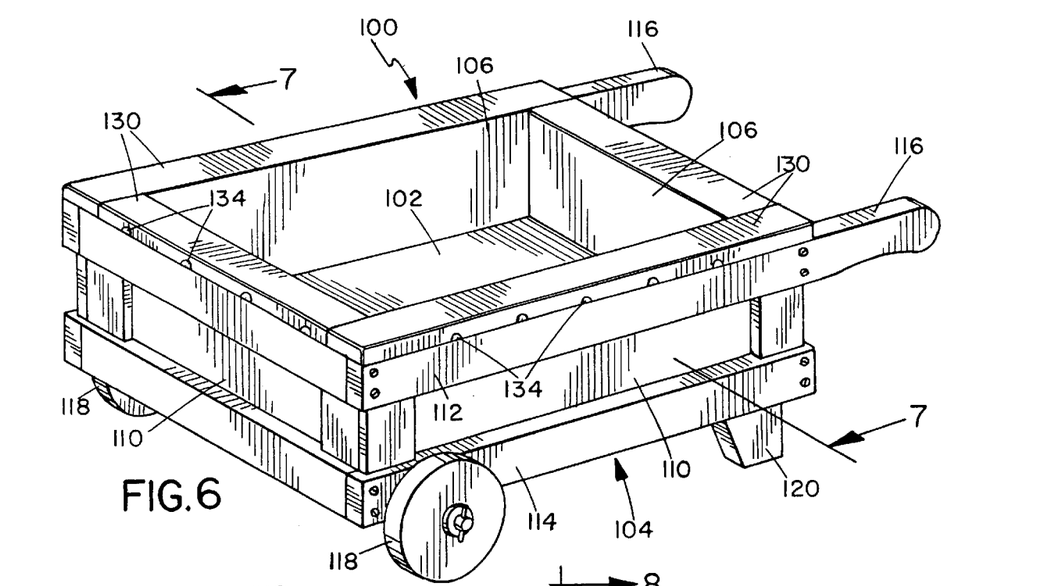
FIG. 6 is a perspective view of a second configuration of the fire cart.
Figure 7:
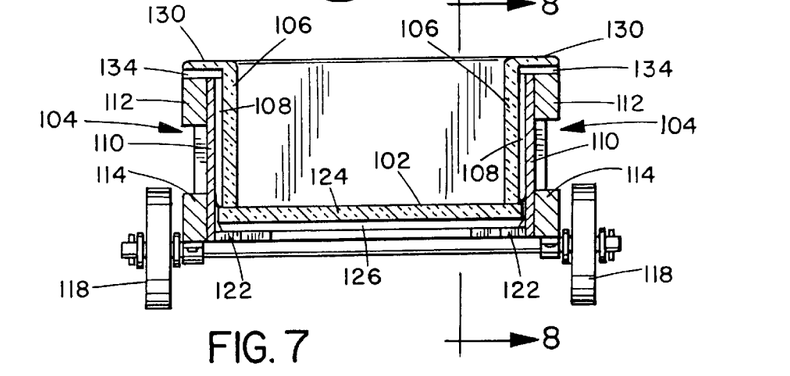
FIG. 7 is a sectional view taken on line 7—7 of FIG. 6.
Figure 8:
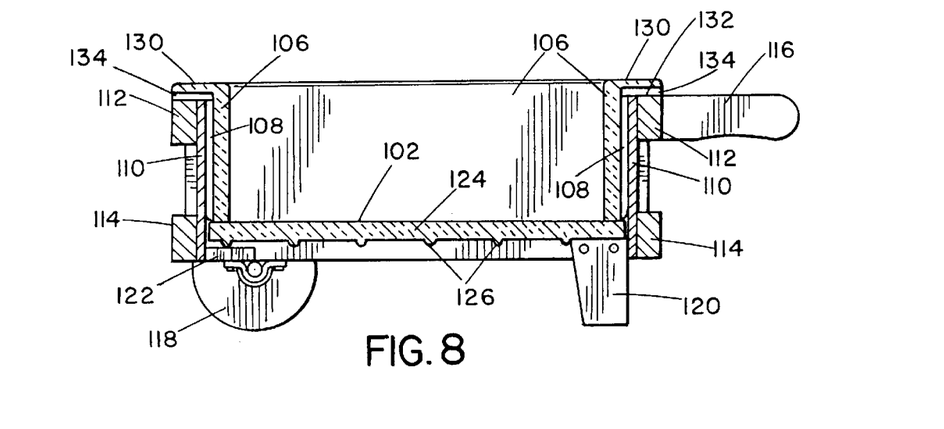
FIG. 8 is a sectional view taken on line 8—8 of FIG. 7.

FIGS. 6 to 10, 12, and 14 illustrate a firebox or cart 100 according to another embodiment of the invention. The box 100 basically comprises a four-sided enclosure of generally square or rectangular shape and having an open top, as in the previous embodiment. Box 100 has a floor 102, outer side walls 104 extending around the outer periphery of the box, and inner side walls 106 spaced inwardly from side walls 104 to leave an air gap 108, as illustrated in FIGS. 7 and 8.

The outer side walls 104 are preferably of wood construction, or of other, man-made materials designed to simulate wood, with each side wall comprising a wood panel 110 and upper and lower horizontal beams 112, 114 extending along the upper and lower edges, respectively, of panel 110. The side panels are suitably secured together at the corners of the box by nails or the like. The upper beams 112 on two opposite sides of the box are extended at one end to form handles 116, and wheels 118 are mounted at the opposite end of the box so that it may be readily transported from one location to another. Support feet 120 are provided at the opposite end of the box to wheels 118 to maintain the box in a horizontal orientation when in use.

Support blocks 122 are mounted at the front corners of the enclosure, and a floor panel 124 of suitable fire insulating material is supported on blocks 122 at the front of the box and on feet 120 at the rear end of the box, as indicated in FIGS. 2 and 3. Preferably, panel 124 is of cast ceramic or cement material, and has a plurality of parallel ribs 126 running along its lower surface for spacing the panel 124 above the support blocks 122 or the support panel 125, as illustrated in FIGS. 8 and 11.

Figure 9:
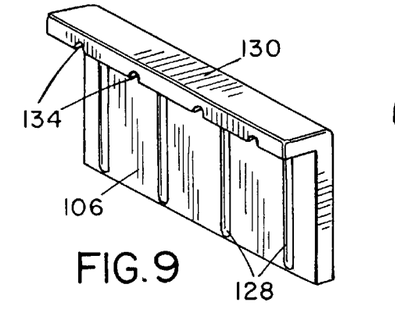
FIG. 9 illustrates one form of an end liner panel.
Figure 10:
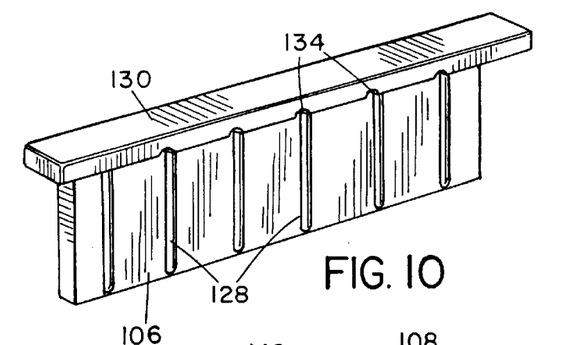
FIG. 10 illustrates another form of a side liner panel.

Inner side walls or panels 106 are also of fire insulating material, and are preferably formed of the same material as floor panel 124. As best illustrated in FIGS. 9 and 10, each side panel has a plurality of spaced vertical ribs 128 extending across its outer surface and an outwardly projecting upper rim or flange 130 for engaging over the upper edge 132 of the respective side wall. The ribs 128 act to space the panels 106 from the outer side wall 104 to form air gap 108. A plurality of spaced grooves 134 are provided in the lower surface of each flange 130 for air flow into and out of air gap 108, as best illustrated in FIGS. 6 and 7.

Figure 12:
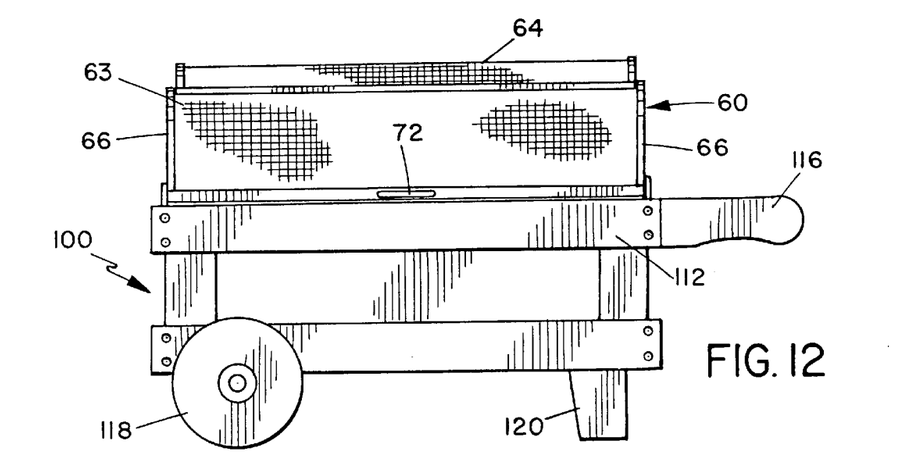
FIG. 12 is a side elevation view of the cart with a retractable screen hood similar to that of FIG. 5.
Figure 14:
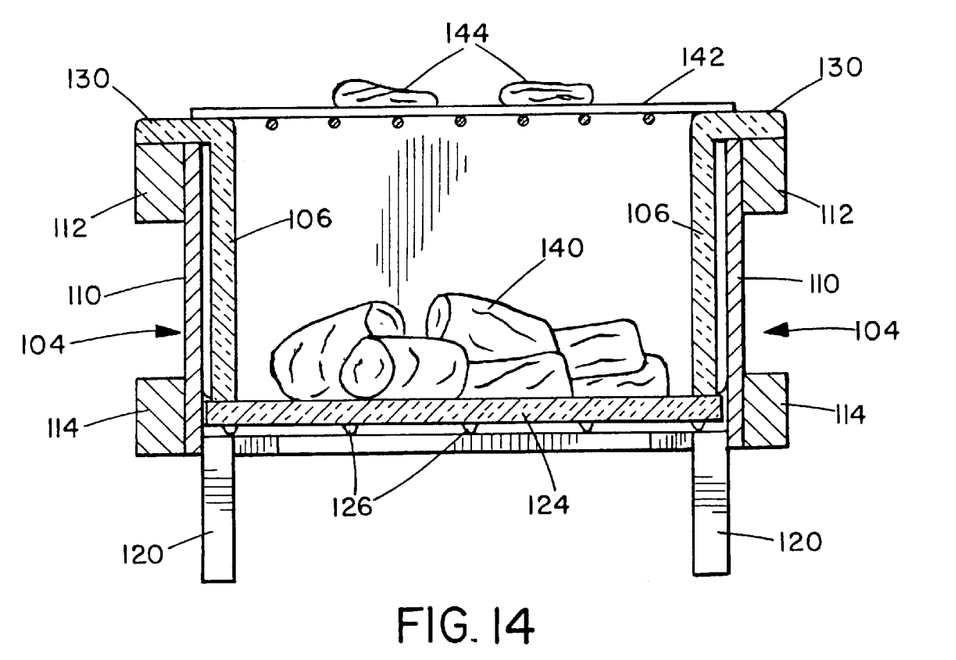
FIG. 14 is an enlarged view similar to FIG. 7 showing the cart as set up for cooking.

As best illustrated in FIG. 12, a three part, retractable hood or cover 60 identical to the cover described above in connection with FIG. 5 may also be placed over the open upper end of the firebox 100. The cover 60 is identical to that of the previous embodiment, and like reference numerals have been used for like parts as appropriate. FIG. 14 illustrates the firebox or cart 100 arranged for cooking. Suitable combustible material such as firewood 140, coal, or the like is placed onto the floor panel 124 and lit. A metal grill 142 is placed over the open end of the firebox, and food 144 to be cooked is placed on the grill. Although the grill 142 is placed directly onto flanges 130 in the illustrated embodiment, it may alternatively be mounted on adjustable brackets or the like for adjusting the height of the food above the fire. The insulating side panels 106 and floor 124 insulate the fire enclosure and reduce heat loss. The panels, air gap, and outer side walls of wood together provide excellent insulation and no hot external surfaces. The outer side walls may be touched without risk of accidental burns.

Figure 11:
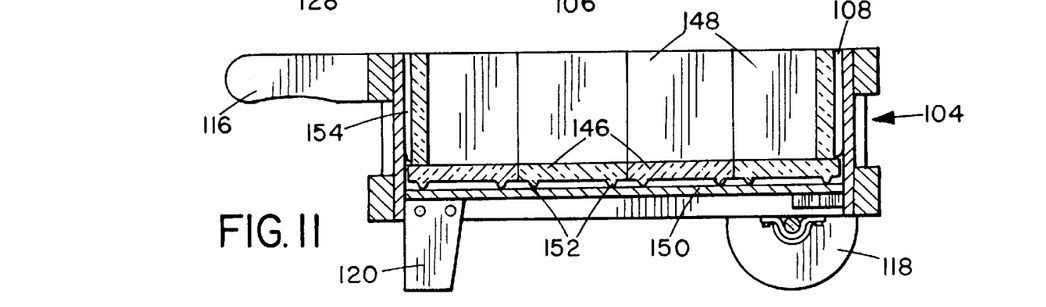
FIG. 11 is a view similar to FIG. 8 showing alternative modular liner panels.

FIG. 11 illustrates a modification to firebox 100, in which the one piece, cast floor and side panels are replaced with modular blocks or strips 146, 148, respectively, of similar fire insulating material. The blocks 146 forming floor 102 are supported on a metal support plate 150 extending across the open lower end of the box. As in the previous embodiment, the blocks 146 and 148 have ribs 152, 154 forming spacers to leave an air gap between the respective insulating layer and outer structure of the box, for additional insulation. The upper flanges 130 of the inner side panels are eliminated in this embodiment, leaving air gap 108 open at the upper end of the box. This embodiment is otherwise identical to the previous embodiment, and like reference numerals have been used for like parts as appropriate.

Figure 13:
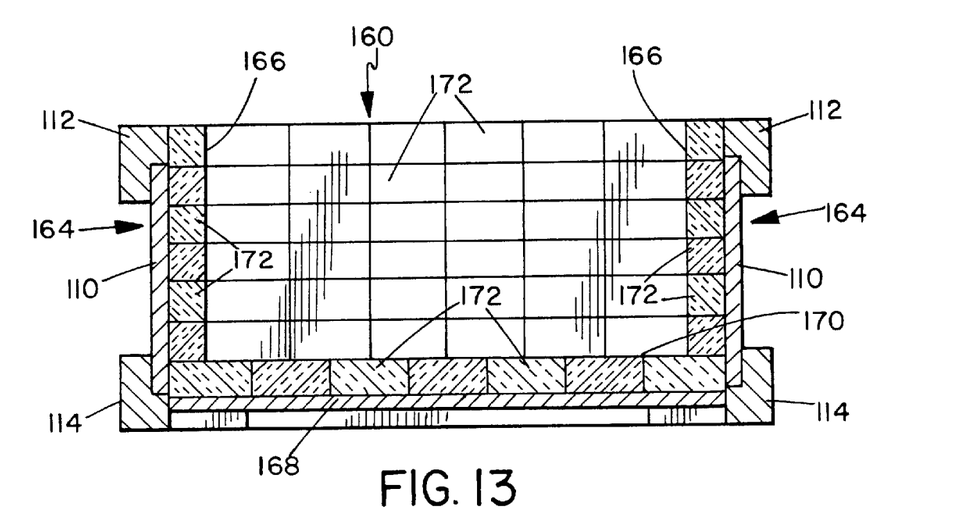
FIG. 13 is an enlarged view similar to a portion of FIG. 7, showing an alternative firebrick lining.

FIG. 13 illustrates a firebox 160 according to another embodiment of the invention. As in the previous embodiments, box 160 basically comprises a four-sided enclosure of generally square or rectangular shape and having an open top. Box 160 has a floor 162, outer side walls 164 extending around the outer periphery of the box, and inner side walls 166 of suitable insulating material. Floor 162 comprises a flat lower support panel 168 of metal, wood or the like, and a layer 170 of insulating material supported on top of support panel 168. Preferably, the inner side walls 166 and floor layer 170 comprise blocks or bricks 172 of a suitable fire insulating material, such as firebricks or other common brick. As in the previous embodiments, the outer side walls 166 are preferably of wood, and are of equivalent construction to the previous embodiment, with like reference numerals being used for like parts.

The firebox 160 of this embodiment will also be provided with handles at one end, wheels and feet, as in the previous embodiments, although these are not illustrated in FIG. 13 since they will be of identical construction to the previous embodiments. If desired, an air gap may be left between outer side walls 164 and inner layers or walls 166 of brick.

Although some preferred embodiments of the invention have been described above by way of example only, it will be understood by those skilled in the field that modifications may be made to the disclosed embodiments without departing form the scope of the invention, which is defined by the appended claims.

I claim:

1. A campfire box, comprising:
   an enclosure having a periphery, an open top, a closed floor, and inner and outer side walls extending around the periphery of the enclosure;
   the floor comprising a support structure and at least one floor layer of fire insulating material extending over said support structure;
   the inner side walls and floor layer together forming an inner cavity for containing a fire, the cavity being separated from the outer side walls and floor support structure and forming an insulated enclosure for combustible material; and
   the outer side walls are of wood.

2. The box as claimed in claim 1, wherein the inner side walls are of insulating material.

3. The box as claimed in claim 1, wherein the inner side walls are of metal.

4. The box as claimed in claim 1, including panels of insulating material between the inner and outer side walls.

5. The box as claimed in claim 4, wherein the inner and outer side walls are spaced apart, and the metal side walls each comprise a metal panel having outwardly projecting upper, lower and side flanges forming a recess for mounting a respective insulating panel.

6. The box as claimed in claim 5, wherein the upper flange of each panel extends between the inner wall and outer wall.

7. The box as claimed in claim 6, wherein a gap is provided between each insulating panel and outer wall, and the upper flange of each panel has a plurality of openings aligned with said gap for air flow through said panel.

8. The box as claimed in claim 1, including wheels positioned adjacent one end of the enclosure for movably supporting the box.

9. The box as claimed in claim 1, wherein the inner and outer side walls are spaced apart.

10. The box as claimed in claim 1, including a plurality of spaced, parallel support bars extending between one pair of opposing side walls beneath the floor of the enclosure, the support bars comprising a rigid support for said floor.

11. The box as claimed in claim 1, wherein the inner side walls and floor layer each comprise at least one layer of bricks.

12. The box as claimed in claim 11, wherein the bricks are selected from a group consisting of clay and fire bricks.

13. The box as claimed in claim 11, wherein the floor layer comprises a first layer of bricks laid in a first direction, and a second layer of bricks laid over the first layer in a second direction perpendicular to said first direction.

14. The box as claimed in claim 1, including a retractable cover for covering the open top of the enclosure.

15. The box as claimed in claim 14, wherein the cover is of a generally semi-cylindrical shape.

16. The box as claimed in claim 15, wherein the cover is of wire mesh material.

17. The box as claimed in claim 14, wherein the cover comprises at least two sections pivoted together for movement between a full extended position completely covering the open top and a retracted position partially opening the top of the enclosure.

18. The box as claimed in claim 1, wherein the floor layer and inner side walls each comprise a panel of insulating material.

19. The box as claimed in claim 18, wherein each insulating panel has a plurality of ribs on its outer surface for forming an air gap between the respective panel and the outer side walls and floor support structure, respectively.

20. The box as claimed in claim 18, wherein each insulating panel is formed from material selected from the group consisting of: castable ceramic material, castable cementious material, masonry, pumice and spun glass material.

21. The box as claimed in claim 18, wherein each insulating panel forming an inner side wall has an upper end having an outwardly projecting rim for extending over the upper end of the respective outer side wall.

22. A campfire box, comprising:
an enclosure having a periphery, an open top, a closed floor, and inner and outer side walls extending around the periphery of the enclosure;
the floor comprising a support structure and at least one floor layer of fire insulating material extending over said support structure;
the inner side walls and floor layer together forming an inner cavity for containing a fire, the cavity being separated from the outer side walls and floor support structure and forming an insulated enclosure for combustible material; and
panels of insulating material located between the inner and outer side walls;
the insulating panels being spaced from the outer side walls.

23. A campfire box, comprising:
an enclosure having a periphery, an open top, a closed floor, and inner and outer side walls extending around the periphery of the enclosure;
the floor comprising a support structure and at least one floor layer of fire insulating material extending over said support structure;
the inner side walls and floor layer together forming an inner cavity for containing a fire, the cavity being separated from the outer side walls and floor support structure and forming an insulated enclosure for combustible material;
the enclosure having opposite first and second ends, and wheels positioned adjacent the first end for movably supporting the box; and
a pair of handles projecting from the second end of the enclosure.

24. A campfire box, comprising:
an enclosure having a periphery, an open top, a closed floor, and inner and outer side walls extending around the periphery of the enclosure;
the floor comprising a support structure and at least one floor layer of fire insulating material extending over said support structure;
the inner side walls and floor layer together forming an inner cavity for containing a fire, the cavity being separated from the outer side walls and floor support structure and forming an insulated enclosure for combustible material; and
the floor of the enclosure comprising a pair of spaced, parallel, rigidly supported metal screens forming a support housing, and a layer of insulating material located in the housing.

25. The box as claimed in claim 24, wherein the insulating material is pumice.

26. A campfire box, comprising:
an enclosure having a periphery, an open top, a closed floor, and inner and outer side walls extending around the periphery of the enclosure;
the floor comprising a support structure and at least one floor layer of fire insulating material extending over said support structure;
the inner side walls and floor layer together forming an inner cavity for containing a fire, the cavity being separated from the outer side walls and floor support structure and forming an insulated enclosure for combustible material; and
each outer wall comprising a vertical panel having an upper end and a lower end, an upper beam extending transversely across the upper end of the panel on the outside of the enclosure, a lower beam extending transversely across the lower end of the panel on the outside of the enclosure, and fasteners securing the beams and panels together.

27. The box as claimed in claim 26, wherein the lower beams of two opposing outer walls each have a plurality of spaced, inwardly directed sockets aligned with respective sockets on the opposing lower beam, and a plurality of spaced cross bars extend across the lower wall of the enclosure, each cross bar having opposite ends supported in a respective pair of opposing sockets in the lower beams, the cross bars comprising said floor support structure.

28. A campfire box, comprising:
a rigid outer frame forming outer walls, a lower support, and an open top, the outer walls having inside surfaces and outside surfaces;
a floor supported by said lower support;
an inner wall of fire insulating material positioned inside the outer frame and having side portions covering the inside surfaces of said outer walls and a lower portion covering said floor, forming an insulated enclosure for enclosing fire combustible materials;
wheels positioned adjacent at least one side of the frame for movably supporting said frame;
the side portions of said inner wall comprising insulating panels extending over and spaced inwardly from said outer walls with a space between each panel and the respective outer wall; and
an inner layer of metal covering each insulating panel.

29. A campfire box, comprising:
a rigid outer frame forming outer walls, a lower support, and an open top, the outer walls having inside surfaces and outside surfaces;

a floor supported by said lower support;

an inner wall of fire insulating material positioned inside the outer frame and having side portions covering the inside surfaces of said outer walls and a lower portion covering said floor, forming an insulated enclosure for enclosing fire combustible materials; and wheels positioned adjacent at least one side of the frame for movably supporting said frame; and the lower portion of said inner wall comprising at least one layer of bricks.

30. A campfire box, comprising:

a rigid outer frame forming outer walls, a lower support, and an open top, the outer walls having inside surfaces and outside surfaces;

a floor supported by said lower support;

an inner wall of fire insulating material positioned inside the outer frame and having side portions covering the inside surfaces of said outer walls and a lower portion covering said floor, forming an insulated enclosure for enclosing fire combustible materials;

wheels positioned adjacent at least one side of the frame for movably supporting said frame; and the box comprising a four-cornered box, each outer wall including an upper timber and a lower timber spaced below the upper timber, and upper and lower corner connections connecting the upper timbers and lower timbers, respectively, together at corners of the box.

31. The box as claimed in claim 30, wherein the upper timbers of two sides of the box are extended outwardly from the box at one end opposite to said wheels, to form handles for lifting said one end of said box and moving said box on said wheels.

32. The box as claimed in claim 30, wherein said inner wall is formed from at least one layer of insulating bricks.

* * * * *